United States Patent [19]

Yamamoto et al.

[11] Patent Number: 5,067,835
[45] Date of Patent: Nov. 26, 1991

[54] PRINTING APPARATUS

[75] Inventors: Takemi Yamamoto, Nagoya; Shigeo Ishikawa, Aichi, both of Japan

[73] Assignee: Brother Kogyo Kabushiki Kaisha, Nagoya, Japan

[21] Appl. No.: 605,483

[22] Filed: Oct. 30, 1990

[30] Foreign Application Priority Data

Nov. 27, 1989 [JP] Japan .................................. 1-306849

[51] Int. Cl.5 ..................... B41J 11/46; G03G 21/00; B65H 7/02
[52] U.S. Cl. ................... 400/582; 400/583.3; 400/624; 271/265; 271/145; 355/311; 355/40
[58] Field of Search ..................... 400/613, 583, 583.3, 400/582, 624; 271/145, 264, 265; 355/40, 311, 316, 317, 308

[56] References Cited

U.S. PATENT DOCUMENTS

| 4,494,862 | 1/1985 | Tanaka | 355/14 C |
| 4,716,438 | 12/1987 | Farrell | 355/6 |
| 4,757,348 | 7/1988 | Rourke et al. | 355/6 |
| 4,765,765 | 8/1988 | Futakata | 400/614 |
| 4,815,879 | 3/1989 | Yokoi | 400/636 |
| 4,855,769 | 8/1989 | Slavitter et al. | 354/21 |
| 4,920,376 | 4/1990 | Yamamoto | 355/38 |
| 4,937,615 | 6/1990 | Tokuda | 355/35 |
| 4,975,735 | 12/1990 | Bright | 355/75 |
| 4,982,224 | 1/1991 | Yamamoto et al. | 355/27 |

FOREIGN PATENT DOCUMENTS

| 118936 | 3/1977 | Japan | 400/583.3 |
| 155078 | 2/1983 | Japan | 400/582 |
| 30369 | 7/1983 | Japan | 400/582 |
| 162375 | 1/1985 | Japan | 400/583.3 |
| 272178 | 5/1985 | Japan | 400/583.3 |
| 116573 | 10/1985 | Japan | 400/613 |
| 193858 | 2/1986 | Japan | 400/583 |
| 125363 | 11/1986 | Japan | 400/624 |

Primary Examiner—Edgar S. Burr
Assistant Examiner—E. P. Raciti
Attorney, Agent, or Firm—Oliff & Berridge

[57] ABSTRACT

A printing apparatus includes a feed cassette detachably loaded in a main body of the printing apparatus for containing cut sheets, a sheet feeder unit for feeding a cut sheet contained in the feed cassette to the main body of printing apparatus, a printing unit for printing on the cut sheet feed by the sheet feeder unit, a bar code provided on the feed cassette or the cut sheet contained in the feed cassette for representing various information about the cut sheet, a bar code reader for reading the bar code, and an electronic control apparatus for controlling the sheet feeder unit and the printing unit. The bar code reader is provided on the main body of the printing apparatus at which the bar code reader is able to read the bar code when the feed cassette is loaded in the main body of the printing apparatus. The electronic control apparatus controls the sheet feeder unit and the printing unit based on the bar code read by the bar code reader.

20 Claims, 6 Drawing Sheets

PRINTING APPARATUS

BACKGROUND OF THE INVENTION

1. Field of the Invention

The present invention relates to a printing apparatus and, more particularly, to a printing apparatus for printing on a cut sheet supplied from a feed cassette.

2. Discussion of the Related Art

In a conventional printing apparatus, various types of sensors are provided in the course of a path traveled by a supply of sheets from a feed cassette, and the most suitable print condition is determined based on signals indicative of sheet information (for example, information about the size of a sheet, the thickness of a sheet, etc.) detected by the sensors, thereby enabling print adjustments to be made on the sheet in accordance with the detected signals.

Such sensors have been used, for example, to detect the thickness of the sheet for thereby appropriately setting an interval, or head gap, between a print head and the sheet, and, more specifically, for setting an interval between a print wire of the print head and the sheet or an interval between a tip portion of an ink jet nozzle of the print head and the sheet. Such sensors have also been used to detect the width of the sheet for thereby adjusting a print allowance range, a print start position, etc.

The above-described conventional printing apparatus does not, however, perform in a satisfactory manner for reasons set forth herein.

When one kind of sheet differs from another kind of sheet in elastic coefficient of the sheet or friction coefficient on the surface of the sheet, even when the sheets have equal thickness, the suitable nip pressure for the one kind of sheet provided by feed rollers of the apparatus is different from the suitable nip pressure for the other kind of sheet. Therefore, if the suitable nip pressure is not set in accordance with the elastic coefficient of the sheet or the friction coefficient of the surface of the sheet, a mis-feed can occur such as a superimposed sheet delivery, omission, and an excessive skew causing the sheets to be obliquely delivered in excess.

Various types of sensors can be added or provided in order to avoid such inconvenience. However, limitations are imposed on the number of sensors which can be provided in the course of a restricted sheet supply path. When it is necessary to detect the elastic coefficient of the sheet, the friction coefficient thereof or the like, the arrangement of the respective sensors becomes cumbersome, thus leading to an unreal solution. Various sheet information for each sheet can be input by a keyboard or the like. Errors can, however, occur in the input of information by the operator. Unnecessary labor is further required to input the information.

SUMMARY OF THE PRESENT INVENTION

An object of the present invention is to provide a printing apparatus which permits the control based on various sheet information using a simplified structure.

A further object of the present invention is to provide a printing apparatus which is conveniently used.

To achieve the foregoing and other objects and advantages, and to overcome the shortcomings discussed above, there is provided a printing apparatus according to the present invention, which comprises:

a feed cassette detachably loaded in a main body of the printing apparatus, for containing cut sheets;

feeding means for feeding a cut sheet contained in the feed cassette to the main body of the printing apparatus;

printing means for printing on the cut sheet fed by the feeding means;

storing means provided on at least one of the feed cassette and the cut sheet contained in the feed cassette, for storing various information about the cut sheet;

reading means for reading the various sheet information from the storing means, the reading means provided on the main body of the printing apparatus at a location such that the reading means is able to read the various sheet information when the feed cassette is loaded in the main body of the printing apparatus; and controlling means for controlling at least one of the feeding means and the printing means based on the various sheet information read by the reading means.

In the printing apparatus according to the present invention having the above-described arrangement, the reading means collectively reads the various sheet information, for example, the size of the sheet, the friction coefficient of the sheet, the elastic coefficient of the sheet, the thickness of the sheet, etc. from the storing means. The control means controls at least one of the feeding means and the printing means based on the various sheet information read by the reading means.

According to the printing apparatus of the present invention, at least one of the feeding means and the printing means are operated in accordance with the most suitable condition of, for example, the optimum rotational speed of sheet feed rollers, the optimum nip pressure and the optimum head gap. The most suitable condition is set based on the various sheet information collectively read by the reading means from the storing means. The printing apparatus according to the present invention provides a further improvements such as, for example, secure avoidance of the mis-feeding such as delivery of the sheet in a superimposed state and the prevention of the sheet from being jammed or the like. A superior quality of printing can thus be achieved by an increase in the information about the sheet, as compared with the conventional printing apparatus.

Further, since the various sheet information is collectively read by reading means as the feed cassette is loaded in the main body, it is unnecessary to provide sensors for each type of information desired. The arrangement is, therefore, simplified since the operation no longer requires reading all the sheet information as was necessary for the prior art, e.g., the operation of the keyboard or the like. The establishment of the optimum print condition suitable for the sheet is further simplified, so that the convenience in use of the printing apparatus is further improved.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

The present invention will be described in detail with reference to following drawings in which like reference numerals refer to like elements and wherein.

DETAILED DESCRIPTION OF THE PREFERRED EMBODIMENTS

Figure 1:
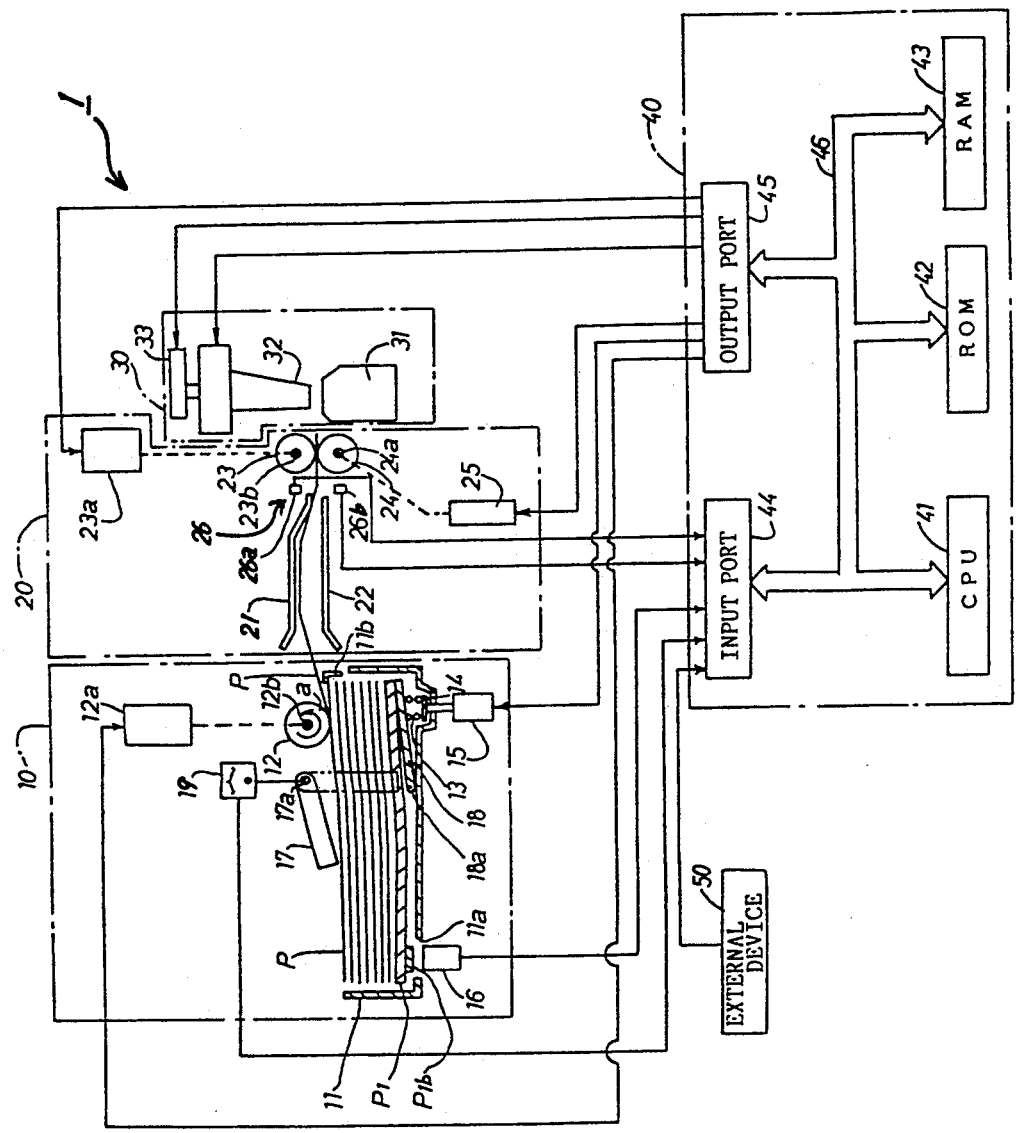
FIG. 1 is a schematic block diagram showing a structure of a printing apparatus according to one embodiment of this invention.

Referring now to the drawings and particularly to FIG. 1 thereof, a printing apparatus according to the present invention is described. Printing apparatus 1 comprises a sheet feeder unit 10 for feeding layered sheets P one by one, a sheet carrier unit 20 for carrying each of the sheets P delivered from the sheet feeder unit 10, a printing unit 30 for performing the printing on the delivered sheets P and an electronic control apparatus 40 for actuating the sheet feeder unit 10, the sheet carrier unit 20 and the printing unit 30.

The sheet feeder unit 10 of the printing apparatus 1 comprises a cassette 11 detachably mounted thereon, a pair of feed rollers 12 rotatable about a shaft 12b in response to the rotation of a stepping motor 12a, a cylinder 15 brought into contact with a disc 14 mounted on the lower end portion of a spring 13 provided in the cassette 11 and used to cause the disc 14 to move upward and downward alternately for thereby changing the length of the spring 13, a bar code reader 16 provided in an opposing relationship to a detection window 11a for the cassette 11 which has already been installed in the sheet feeder unit 10, a swing member 17 which serves to swingably turn about a shaft 17a as indicated by the two-dot chain line in the drawing in accordance with the amount of the sheets contained in the cassette 11, and a residual-amount-of-sheet detector 19 for detecting the residual amount of the sheets based on the swing angle of the swing member 17. One feed roller 12 is provided at each of two positions, i.e., on the front side as illustrated in FIG. 1 and on a side opposite the front side.

The cylinder 15 adjusts the force necessary for forcibly pushing the sheets P in the cassette 11 toward the feed rollers 12, i.e., the nip pressure produced on the feed rollers 12 in accordance with the degree of change in the length of the spring 13. Thus, when the feed rollers 12 are rotated in the direction indicated by an arrow a, a sheet P at the top surface of the sheets located in the cassette 11, which has been pressure-fitted in by the feed rollers 12 based on the nip pressure, is moved to the sheet carrier unit 20 by the frictional force exerted between the sheet P and the rollers 12 to be brought into contact with a scraper 11b provided at the tip portion of the cassette 11 and to be subjected to a bent state, to thereby be separated into one sheet. Thereafter, it is delivered to the sheet carrier unit 20. Each of the feed rollers 12 is freely rotatable with a one-way clutch function in the direction indicated by the arrow a with respect to the external force even when the stepping motor 12a stops its rotation.

A description will now be made of the sheets P contained in the cassette 11.

Figure 2:
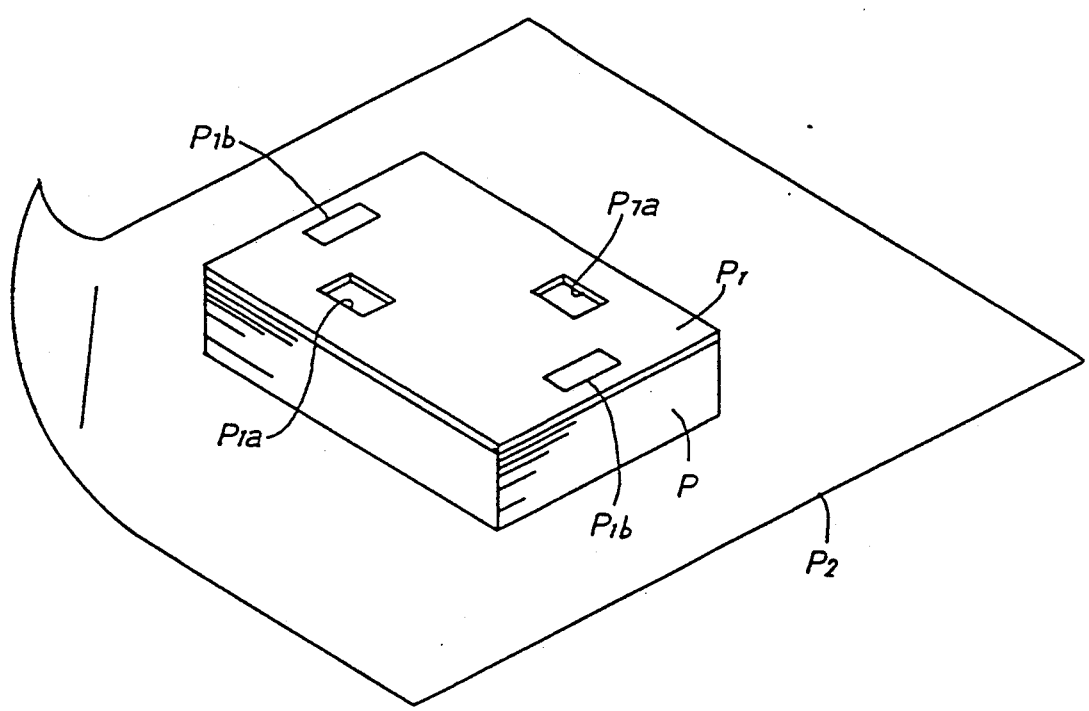
FIG. 2 is a diagram for describing a state of layered cut sheets being packaged.

As shown in FIG. 2, the sheets P have their reverse sides (on which printing is not effected) superimposed on the base plate P1 of a cardboard material and thereafter covered with a wrapping sheet P2. The base plate P1 has a set of paper empty detection holes P1a through which the tip portion of the swing member 17 is inserted, and a set of bar code labels P1b on which various sheet information such as information about the size of the sheet, the thickness of the sheet, the friction coefficient of the sheet and the elastic coefficient of the sheet are recorded. Both of the two sets are point-symmetrically arranged with respect to the center of the external shape of the base plate P1. A method of accommodating the cassette (for example, the base plate P1 is placed downwards to be contained in the cassette) is printed on the surface of the base plate P1.

Figure 3:
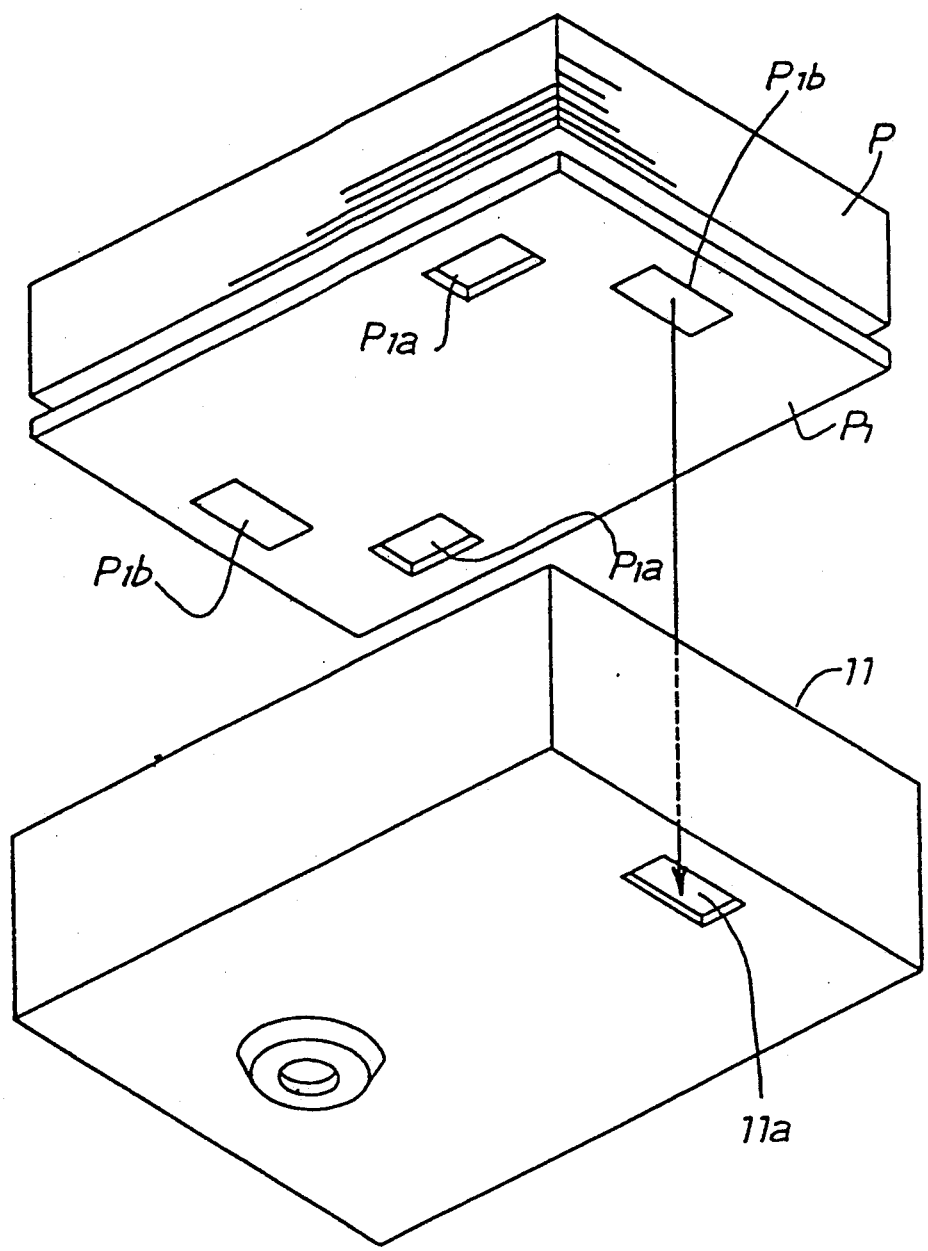
FIG. 3 is a diagram for describing a state of sheets being contained in a feed cassette.

Accordingly, as shown in FIG. 3, when the opened sheets P are contained in the cassette 11 with the base plate P1 being arranged downwards, the bar code labels P1b are disposed in an opposing relationship to the bar code reader 16 through the detection window 11a of the cassette 11 and in turn through the cassette 11 mounted on the sheet feeder unit 10. The sheets P are positioned on the upper portion of the spring 13 and set between a sheet lifting member 18 in the cassette 11 which serves to swingably turn about the shaft 18a and the feed rollers 12.

The sheet carrier unit 20 for carrying the sheets to the printing unit 30 comprises carrier guides 21, 22 for defining a path used for the sheets P delivered from the feed rollers 12, a driving roller 23 rotatable about a shaft 23b in response to the rotation of a stepping motor 23a, a driven roller 24 brough into contact in pressure with the driving roller 23 to be reversely rotated about a shaft 24a with respect to the rotation of the driving roller 23, a roller pressure-fitting-in force control mechanism 25 for controlling the pressure-fitting-in force of the driven roller 24 with respect to the driving roller 23 by an unillustrated spring, and two sensors 26, each having light emitter 26a and light receiver 26b, provided on the upstream side of the driving roller 23 and the driven roller 24 to detect each of the sheets P.

The driving roller 23, the driven roller 24 and the sensors 26 are respectively provided at two locations one of which is on the front side and the other of which is on the opposite side, as viewed in the drawing. It is determined whether or not skew is produced due to the difference between a sheet detection time measured by one sensor 26 and a sheet detection time measured by another sensor 26. If it is judged that there is a slight skew within the allowable range or there is no skew, the driving rollers 23 begin rotating when the sheet P is detected by the sensors 26. If it is judged that there is a skew beyond the allowable range, the driving rollers 23 begin rotating after a prescribed period of time has elapsed after the time when the sheet P is detected by the sensors 26, to apply a bending to the sheet P on the upstream side of the driving rollers 23 so that whatever skew there is is canceled.

The printing unit 30 to which the sheets P are carried from the sheet carrier unit 20 includes a platen 31, a print head 32 provided in an opposing relationship to the platen 31 and a head gap adjusting mechanism 33 operated so as to cause the print head 32 and the platen 31 to approach each other and to move farther apart from one another. The sheets P are printed with a head gap adjusted in an appropriate interval.

The electronic control apparatus 40 for actuating the sheet feeder unit 10, the sheet carrier unit 20 and the printing unit 30 comprises a known CPU 41, a ROM 42, a RAM 43, an input port 44, an output port 45 and a bus 46 connecting these elements to one another. The electronic control apparatus 40 also drives and controls the stepping motor and the like based on data received from each of the sensors to output print data. Connected to the input port 44 are an external device 50 such as a keyboard for inputting print data, as well as the bar code reader 16 for reading various sheet information written on the bar code labels P1b, the residual-amount-of-sheet detector 19 for detecting the residual amount of the sheets and various sensors such as the pair of sensors 26 for sensing the sheets P. To the output port 45 are connected the cylinder 15 adapted to adjust the force, i.e., the nip pressure at the feed rollers 12, for forcibly pushing the sheets P in the cassette 11 toward the feed rollers 12, the roller pressure-fitting-in force control mechanism 25 for controlling the pressure-fitting-in force of the driven rollers 24 with respect to the driving rollers 23, the print head 32 used to print characters on the sheets P and the head gap adjusting mechanism 33 for the print head 32.

A description will now be made of the procedure for initializing the printing apparatus and the printing routine procedure, both of which are effected by the electronic control apparatus 40 with reference to flow charts of FIGS. 4 and 5.

Figure 4:
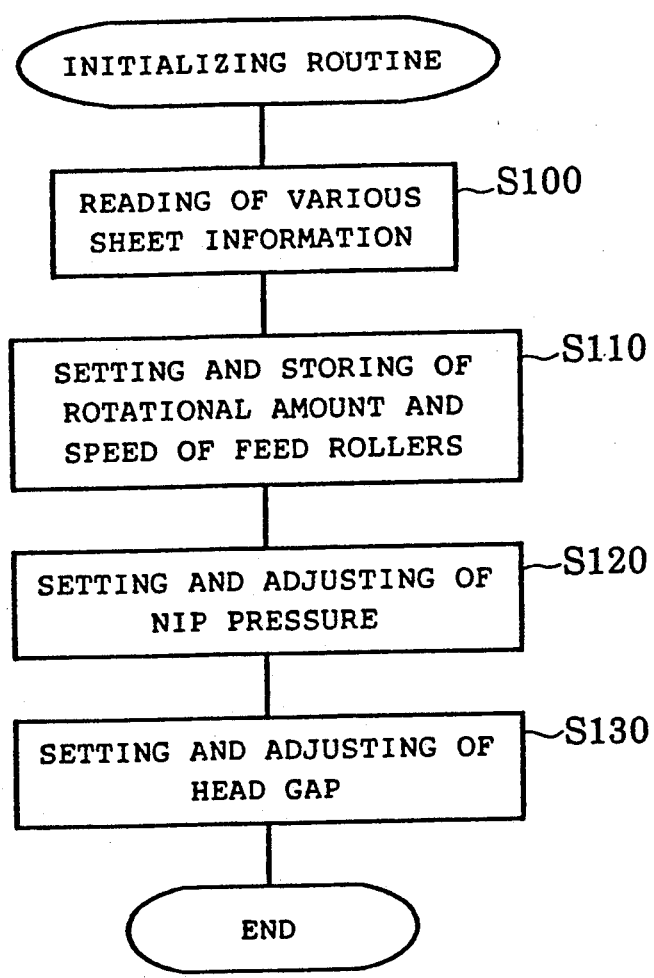
FIG. 4 is a flow chart for describing a routine procedure for initializing the printing apparatus.

The flow chart of FIG. 4 shows a processing operation which is performed each time the cassette 11 is mounted. First, the bar code reader 16 provided on the side of the main body of the printing apparatus 1 reads various sheet information including information about the size of the sheet, the thickness of the sheet, the friction coefficient of the sheet and the elastic coefficient of the sheet, from the bar code labels P1b through the detection window 11a of the cassette 11 (Step, hereinafter abbreviated merely "S", 100). The rotational amount and the rotational speed of the feed rollers 12 which are most suitable for the sheets P in the cassette 11, are established based on the read various sheet information, and thereafter the rotational amount and the rotational speed of the feed rollers 12 are stored in a prescribed address of the RAM 43 (S110). The difference, i.e., the slip amount of the sheet, between an ideal distance required to carry the sheet P without taking into account the sheet P slip on the feed rollers 12 and a distance required to carry the same with the slip being taken into account is calculated in accordance with the friction coefficient on the surface of the sheet, and the rotational amount of the feed rollers 12 is set in view of the slip amount of the sheet and the size of the sheet. In order to perform the most suitable sheet separation, i.e., to take out only the sheet P in the cassette 11 on the top of the sheets, upon carrying the sheet P from the cassette 11 to the sheet carrier unit 20, the rotational speed of the feed rollers 12 is set in accordance with the read information about the elastic coefficient of the sheet. Described specifically, the rotational speed of the feed rollers 12 is set based on the elastic coefficient of the sheet such that the most suitable amount of bending or deflection of the sheet P at the scraper 11b which is provided at the tip portion of the cassette 11, can be obtained. As the sheet P being used has a greater elastic coefficient, a greater rotational speed is adopted for the rotation of the feed rollers 12.

The nip pressure developed at the feed rollers 12, i.e., the force required for pushing up the sheets P toward the feed rollers 12, and the nip pressure of the driven rollers 24 with respect to the driving rollers 23 are then set in accordance with the read various sheet information in the same manner as described above. In addition, the spring cylinder 15 and the roller pressure-fitting-in force control mechanism 25 are driven and controlled to obtain the set optimum nip pressure (S120). More specifically, the nip pressure developed at feed rollers 12 is set based on the information about the elastic coefficient of the sheet and the friction coefficient of the sheet. When the sheet P being used has a greater elastic coefficient or friction coefficient, a greater nip pressure is developed at the feed rollers 12. The nip pressure of the driven rollers 24 with respect to the driving rollers 23 is set greater than the nip pressure developed at the feed rollers 12. Thereafter, the head gap adjusting mechanism 33 is driven to obtain the predetermined most suitable head gap based on the read information about the thickness of the sheet, so that the print head 32 and the platen 31 are arranged with space defined therebetween in accordance with the thickness of the sheet. The head gap is thus properly adjusted, and the initializing routine procedure is temporarily terminated (S130).

A description will now be provided of the printing routine procedure.

Figure 5:
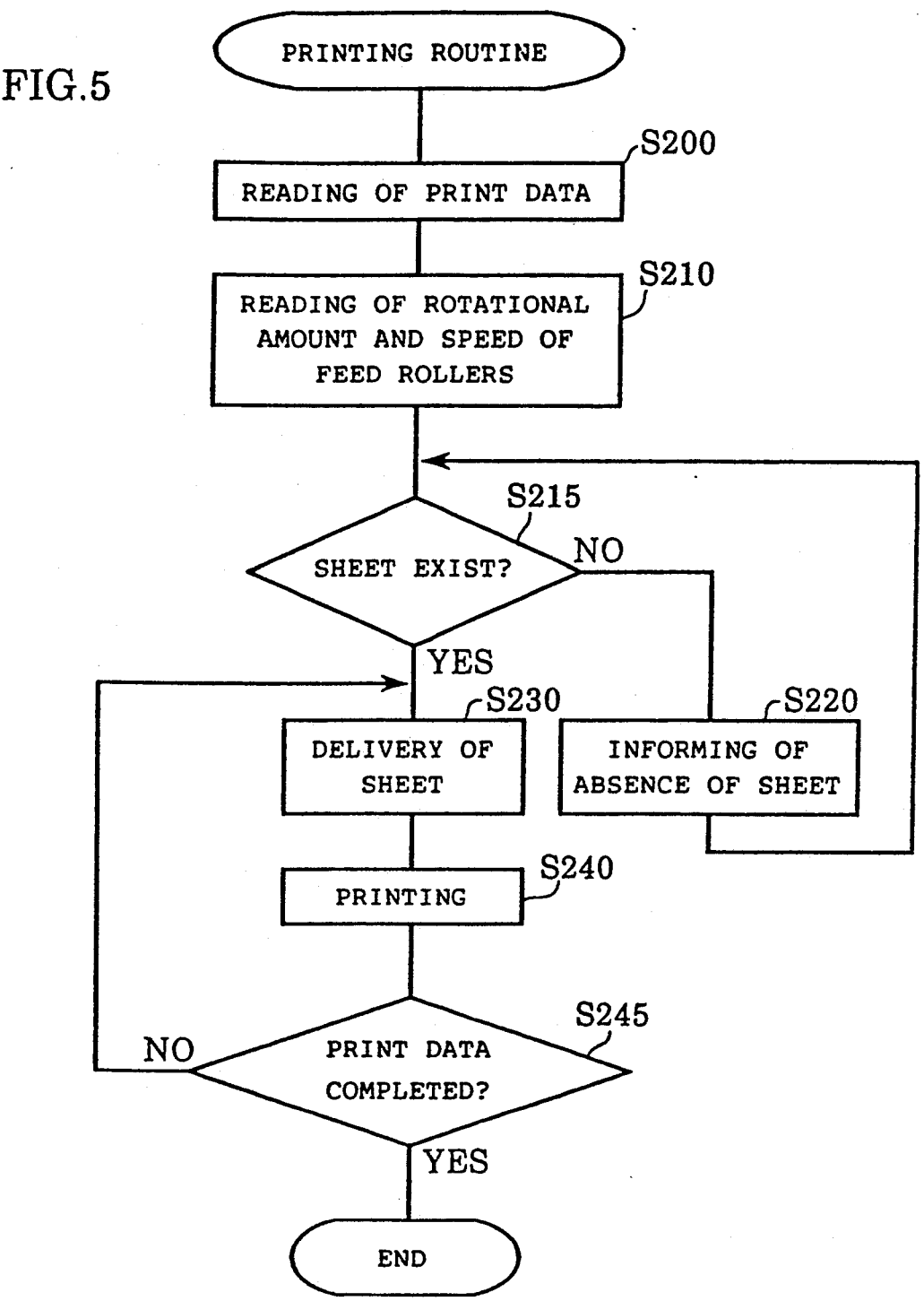
FIG. 5 is a flow chart for describing a printing routine procedure.

FIG. 5 is a flow chart describing the printing routine procedure which is repeated after the initialing procedure, i.e., the clear procedure of an internal register or the like, executed subsequent to turning-on of the power supply. Initially, print data is read from the external device 50 (S200), and the information about the rotational amount and rotational speed of the feed rollers 12 are read out from the RAM 43 in accordance with the procedure for initializing the printing apparatus, which has already been described with reference to FIG. 4 (S210).

It is then determined from the result of detection of the residual-amount-of-sheet detector 19 whether or not the sheets P in the cassette 11 are present (S215). If it is determined that the sheets P are absent, an unillustrated lamp or the like turns on to inform the operator of the absence of the sheets in the cassette (S220). The standby state is continued until the cassette 11 is refilled with sheets P. If it is determined that the sheets P are present, drive signals corresponding to the rotational amount and rotational speed read in S210 are applied to the stepping motor 12a used for the feed rollers 12, thereby causing the delivery of the sheet P to the sheet carrier unit 20 to be performed. Next, the stepping motor 23a for the driving rollers 23 is driven based on the result of the detection of the sensors 26, thereby causing the delivery of the sheet P to the printing unit 30 to be performed (S230). The print data read in S200 is then applied to the print head 32 to be printed (S240). At this point, a drive signal is inputted into the stepping motor 23a used for the driving rollers 23 in order to execute a new-line operation.

It is then determined whether or not the printing using the print data has been completed (S245). If print data is found to be still present, the printing routine procedure is repeated from the above-described S230 until completion of the printing using the print data. If it is found that the printing using the print data has been completed, the printing routine procedure is terminated.

According to the printing apparatus 1 employed in the embodiment having the above arrangement, since the feed rollers 12, the driving rollers 23, the nip-pressure control cylinder 15 and the roller pressure-fitting-in force control mechanism 25 which are all involved in the delivery of the cut sheets P, and the head gap adjusting mechanism 33 which is involved in adjustment of the head gap or the like in the printing apparatus 1, are driven under the most suitable condition, i.e., rotational speed, proper intervals or the like are set based on the various sheet information or parameters collectively read from the bar code labels P1b by the bar code reader 16. A further improvement in the quality of printing is thus achieved with an increase in the amount of information about the parameters as compared with a conventional printing apparatus. The printing apparatus 1 permits the delivery of the sheets P in such a manner that, for example, the slip amount of sheet, the bending amount of sheet at the scraper 11b provided at the tip portion of the cassette 11 and the nip pressure have been taken into consideration. It is therefore ensured that mis-feeding is avoided such as superimposed delivery of the sheets P. The end portions of the sheets P are prevented from being wedged, e.g., jammed, by ensuring that the appropriate bending amount necessary for each sheet P is achieved.

Further, since the various sheet information is collectively read, the requirements of sensors for each piece of information (items to be detected) become unnecessary and the constitution of the printing apparatus can be simplified. The print condition can be adjusted as required simply by omitting the operation for reading only the sheet information, e.g., the operation of a keyboard, and information which is suited for the sheets P in the cassette 11 each time the cassette 11 is attached or detached.

Furthermore, in the present embodiment, it is possible to dispose the bar code labels P1b at the detection window 11a, thereby avoiding a wrong operation of setting of the front and reverse sides of a sheet having a designated surface to be printed, and preventing deterioration in the quality of the sheet by a decrease in the frequency of touch by a hand on the sheet. A simple operation is performed to achieve these advantages wherein the sheets P are contained in the cassette 11 such that the base plate P1 is placed down. Since the paper empty detection holes P1a and the bar code labels P1b are respectively provided at two locations which are symmetrical with respect to the center point of the external shape of the base plate P1, the bar code labels P1b can be easily disposed in the detection window 11a of the cassette 11 without any failure and without requiring that the position of the bar code labels P1b be put on the base plate P1 in a precise location where the sheets P in the cassette 11 are contained.

An embodiment of this invention has been described above for illustrative purposes. However, the present invention is not necessarily limited to the above-described embodiment. The present invention can be practiced by modifying it in various ways.

If the position of contact of the sheets P with the feed rollers 12 is changed based on the read sheet information, the bending amount of the sheet at the scraper 11b is further optimized and the reliability on the separation of the sheet at the top of the laminated sheets from the cassette 11 is improved.

Figure 6:
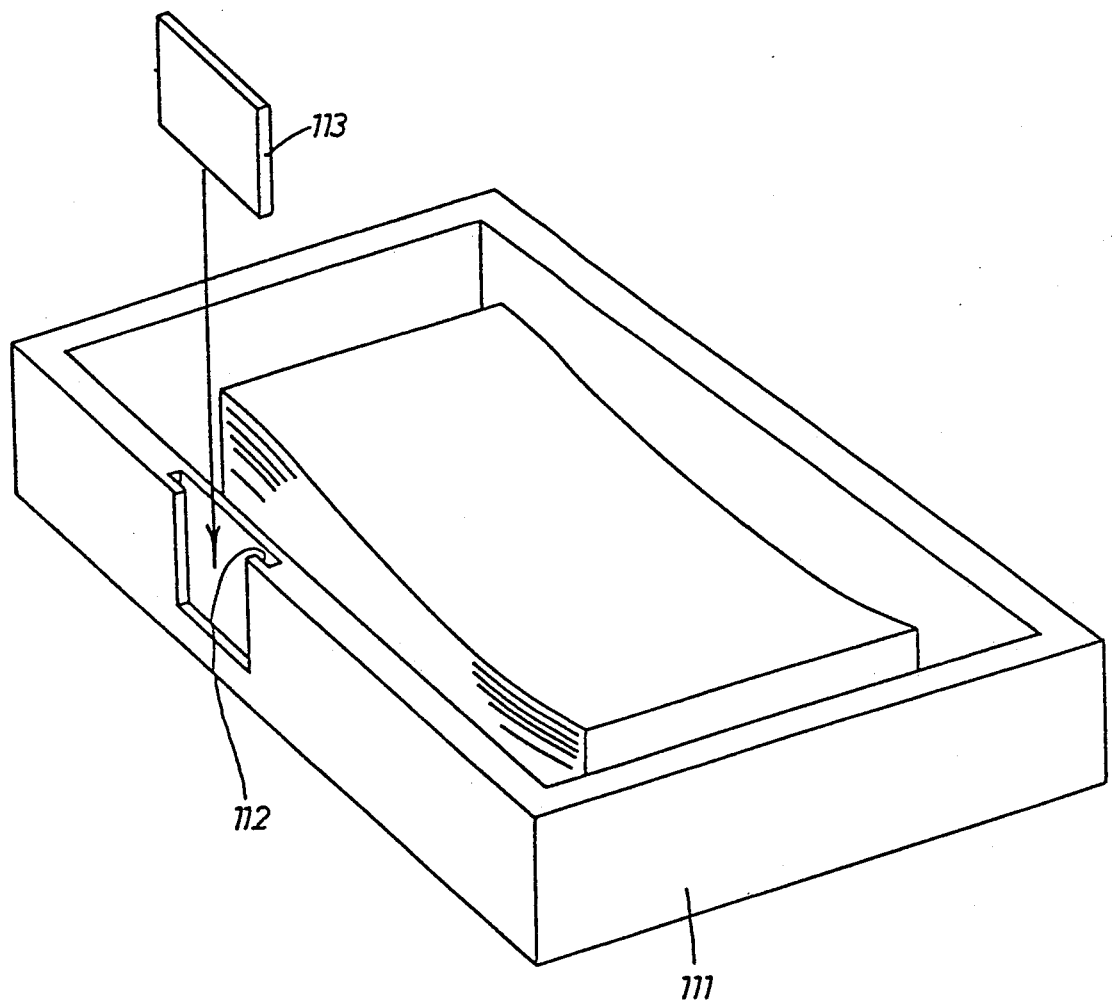
FIG. 6 is a diagram for explaining a feed cassette employed in another embodiment of this invention.

As shown in FIG. 6, a cut-out portion 112 may be defined in the side wall of a cassette 111 to contain therein an exchangeable bar code tag 113 in which the various sheet information about the thickness of the sheet or the like has been written. In the main body of the printing apparatus, a bar code reader may be disposed at a position opposite to the bar code tag 113 when the cassette 111 is mounted. This type of printing apparatus, which is also adjusted in accordance with sheet information as discussed with reference to the FIG. 1 embodiment, requires only a slight modification to the conventional printing apparatus. In addition, any one of the feed rollers 12 involved in the delivery of the cut sheets P or the like and the head gap adjusting mechanism 33 involved in the adjustment of the head gap or the like can be controlled based on the read sheet information.

A description has been made of the printing apparatus. The present invention is applicable to various types of printing apparatus including copying machines. When used in conjunction with a copying machine, a more appropriate copy can be provided by, for example, controlling the fixing temperature or the like in accordance with the sheet information.

The present invention can utilize other types of sheet information. It is possible to add the weight per sheet, the direction of fibers to be composed, the quality of the sheet (plain paper, wood free paper or the like), the color of the sheet, the manufacturer of the sheet, the type of sheet, e.g., paper, special paper, synthetic resin film, etc. as utilized sheet information.

The print quality of the sheets can also be enhanced by providing lot information from the manufacturing process, e.g., a slight difference in size between sheets for each lot, a difference in quality between the sheets for each lot, etc., as the sheet information. Such lot information could be used in adjusting the print condition, so that the quality of the sheets to be printed can be maintained as is preferable, in spite of change in the manufacturing quality in the sheets.

While this invention has been described in conjunction with specific embodiments thereof, it is evident that many alternatives modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A printing apparatus comprising:
   a main body;
   a feed cassette detachably loaded in the main body for containing cut sheets to be printed;
   at least one controllable means disposed along a feed path of a cut sheet from the feed cassette;
   storing means for storing various sheet information about the cut sheets contained in the feed cassette, the storing means being detachably placed in the main body;
   reading means for reading the various sheet information from the storing means when the feed cassette is loaded in the main body, the reading means being provided on the main body; and
   controlling means for controlling the at least one controllable means based on the various sheet information read by the reading means, wherein said at least one controllable means includes a feeding means for feeding a cut sheet from the feed cassette, said storing means stores at least the friction coefficient of the cut sheets, said reading means reads the friction coefficient and said controlling means controls the feeding means based on the friction coefficient read by said reading means.

2. The printing apparatus as recited in claim 1, wherein said feeding means includes a rotatable feed roller for feeding the sheet from the feed cassette, and the controlling means controls the rotational amount of the feed roller based on the friction coefficient of the sheet.

3. The printing apparatus as recited in claim 2, wherein said storing means stores the elastic coefficients of the cut sheet, and the controlling means controls the rotational speed of the feed roller based on the elastic coefficient of the sheet.

4. The printing apparatus as recited in claim 3, wherein the feeding means includes nip pressure adjusting means for adjusting the nip pressure developed between the feed roller and the sheet contained in the feed cassette, and the controlling means controls the nip pressure adjusting means based on the friction coefficient and the elastic coefficient of the sheet.

5. A printing apparatus comprising:
a main body;
a feed cassette detachably loaded in the main body for containing at least cut sheets;
feeding means for feeding a cut sheet from the feed cassette;
printing means for printing on the cut sheet fed by the feeding means;
storing means provided on at least one of the feed cassette and the contents of the feed cassette, said storing means storing various information about the cut sheets, said various information including the friction coefficient of the sheet and the elastic coefficient of the sheet;
reading means for reading the various sheet information from the storing means, the reading means being provided on the main body of the printing apparatus, said reading means reading the various sheet information when the feed cassette is loaded in the main body of the printing apparatus; and
controlling means for controlling at least one of the feeding means and the printing means based on the various sheet information read by the reading means wherein the feeding means includes a rotatable feed roller for feeding the sheet from the feed cassette, and the controlling means controls the rotational amount of the feed roller based on the friction coefficient of the sheet and controls the rotational speed of the feed roller based on the elastic coefficient of the sheet.

6. The printing apparatus as recited in claim 5, wherein the storing means includes a recording medium on which a bar code representing the various sheet information is provided, and the reading means includes a bar code reader for reading the bar code on the recording medium.

7. The printing apparatus as recited in claim 5, wherein the feeding means includes nip pressure adjusting means for adjusting the nip pressure developed between the feed roller and the sheet contained in the feed cassette, and the controlling means controls the nip pressure adjusting means based on the friction coefficient and elastic coefficient of the sheet.

8. The printing apparatus as recited in claim 7, wherein the controlling means controls the nip pressure adjusting means so that the nip pressure between the feed roller and the sheet increases in proportion as at least one of the friction coefficient and the elastic coefficient of the sheet increases.

9. The printing apparatus as recited in claim 5, wherein the controlling means controls the rotational speed of the feed roller so that the rotational speed increases as the elastic coefficient of the sheet increases.

10. The printing apparatus as recited in claim 5, wherein the storing means stores the thickness of the sheet, and the printing means includes a print head, a platen and head gap adjusting means for adjusting an interval between the print head and the platen, and the controlling means controls the head gap adjusting means based on the thickness of the sheet.

11. The printing apparatus as recited in claim 5, wherein the feed cassette includes a base plate, said feed cassette containing cut sheets positioned above the base plate, and the storing means stores the various sheet information on the base plate.

12. The printing apparatus as recited in claim 11, wherein the storing means includes two sets of recording members each of which records the same sheet information about the cut sheet, the two sets of recording members being point-symmetrically arranged on the base plate with respect to a center point of the base plate.

13. The printing apparatus as recited in claim 11, wherein the feed cassette has a bottom wall and is provided with a detection window at the bottom wall, and the reading means is disposed opposite the detection window to read the various sheet information stored on the base plate through the detection window.

14. The printing apparatus as recited in claim 5, wherein the storing means is formed with a recording member having the various sheet information recorded, the feed cassette has a wall and the recording member is detachably disposed on the wall of the feed cassette.

15. The printing apparatus as recited in claim 14, wherein the feed cassette has a side wall and the feed cassette is provided with a cut-out portion on the side wall for receiving the recording member.

16. A printing apparatus comprising:
a main body;
a feed cassette detachably loaded in the main body, said feed cassette for containing at least cut sheets;
storing means provided on at least one of the feed cassette and the contents of the feed cassette, said storing means storing the friction coefficient of the cut sheets; and
reading means for reading the friction coefficient of the cut sheets from the storing means, the reading means being provided on the main body of the printing apparatus, said reading means reading the friction coefficient when the feed cassette is loaded in the main body of the printing apparatus.

17. The printing apparatus as recited in claim 16, further comprising feeding means for feeding a cut sheet from the feed cassette.

18. The printing apparatus as recited in claim 17, further comprising controlling means for controlling the feeding means based on the friction coefficient read by the reading means.

19. The printing apparatus as recited in claim 18, wherein said feeding means includes a rotatable feed roller for feeding the sheet from the feed cassette and the controlling means calculates a slip amount between the feed roller and the cut sheets based on the friction coefficient read by said reading means, said controlling means controlling the rotational amount of the feed roller based on the calculated slip amount.

20. The printing apparatus as recited in claim 19, wherein said storing means stores the elastic coefficient of the cut sheets and the controlling means controls the rotational speed of the feed roller such that the rotational speed of the feed roller increases as the elastic coefficient increases.

* * * * *